(12) United States Patent
Gupta et al.

(10) Patent No.: US 11,531,763 B1
(45) Date of Patent: Dec. 20, 2022

(54) AUTOMATED CODE GENERATION USING ANALYSIS OF DESIGN DIAGRAMS

(71) Applicant: Amazon Technologies, Inc., Seattle, WA (US)

(72) Inventors: Akshay Gupta, Seattle, WA (US); Raghuveer Ketireddy, Redmond, WA (US); Trevor Tonn, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/709,661

(22) Filed: Dec. 10, 2019

(51) Int. Cl.
*G06F 21/57* (2013.01)
*G06F 8/20* (2018.01)
(Continued)

(52) U.S. Cl.
CPC .............. *G06F 21/577* (2013.01); *G06F 8/20* (2013.01); *G06F 8/427* (2013.01); *G06F 8/436* (2013.01);
(Continued)

(58) Field of Classification Search
CPC ........... G06F 8/20–316; G06F 8/34–36; G06F 8/40–52; G06F 8/73; G06F 8/75;
(Continued)

(56) References Cited

U.S. PATENT DOCUMENTS 7,284,274 B1 * 10/2007 Walls ........................ G06F 8/70
726/25
7,818,788 B2 10/2010 Meier
(Continued)

OTHER PUBLICATIONS

Merson, Paulo, Ultimate Architecture Enforcement: Custom checks enforced at code-commit time, Splash '13: Proc of the 2013 companion publication for conf on Systems, prog, & applications: software for humanity, Oct. 2013, pp. 153-160, [retrieved on Aug. 2, 2022], Retrieved from the Internet: <URL:http://dl.acm.org/>.*

(Continued)

*Primary Examiner* — Geoffrey R St Leger
(74) *Attorney, Agent, or Firm* — Robert C. Kowert; Kowert, Hood, Munyon, Rankin & Goetzel, P.C.

(57) ABSTRACT

Methods, systems, and computer-readable media for automated code generation using analysis of design diagrams are disclosed. A diagram-to-code system determines one or more security properties of a plurality of components associated with a software product. Relationships between the components are indicated in a software design diagram. At least some of the security properties are determined using input to a user interface. The diagram-to-code system generates one or more secure code packages based (at least in part) on the software design diagram and the one or more security properties. The secure code package(s) implement one or more security controls associated with the software product. The secure code package(s) are provided to a developer. The secure code package(s) and additional program code from the developer are compiled into a compiled software product. Execution of the compiled software product mitigates security vulnerabilities using the one or more security controls.

19 Claims, 8 Drawing Sheets

(51) Int. Cl.
*G06F 8/41* (2018.01)
*G06F 11/36* (2006.01)
*G06F 8/75* (2018.01)
*G06N 3/04* (2006.01)
*G06N 3/08* (2006.01)
*G06F 8/36* (2018.01)

(52) U.S. Cl.
CPC ............. *G06F 8/44* (2013.01); *G06F 8/447* (2013.01); *G06F 8/75* (2013.01); *G06F 11/3688* (2013.01); *G06N 3/04* (2013.01); *G06N 3/08* (2013.01); *G06F 8/36* (2013.01); *G06F 2221/033* (2013.01)

(58) Field of Classification Search
CPC .......... G06F 11/3688; G06F 2221/033; G06F 21/56; G06F 21/577; G06F 21/60; G06F 9/453; G06N 3/02; G06N 3/04; G06N 3/08
USPC ................. 717/104–109, 120–123, 140–161
See application file for complete search history.

(56) References Cited

U.S. PATENT DOCUMENTS

| | | | |
|---|---|---|---|
| 7,891,003 B2 | 2/2011 | Mir et al. | |
| 8,732,838 B2 | 5/2014 | Medvedev et al. | |
| 8,775,649 B2* | 7/2014 | Blaukopf | G06F 8/35 709/230 |
| 9,244,452 B2* | 1/2016 | Brandes | G05B 19/0426 |
| 9,330,263 B2* | 5/2016 | Cabrera | H04L 63/1433 |
| 9,575,979 B1 | 2/2017 | McClintock et al. | |
| 9,665,721 B2 | 5/2017 | Artes et al. | |
| 9,712,551 B2 | 7/2017 | Grubel et al. | |
| 10,657,025 B2* | 5/2020 | Iyer | G06F 21/577 |
| 10,810,115 B2* | 10/2020 | Manchiraju | G06N 3/08 |
| 10,878,085 B2* | 12/2020 | Wei | G06F 21/54 |
| 2004/0103407 A1* | 5/2004 | Blaukopf | H04L 67/28 717/140 |
| 2008/0109784 A1* | 5/2008 | Levine | G06F 40/14 717/106 |
| 2009/0328223 A1* | 12/2009 | Medvedev | G06F 21/577 726/25 |
| 2012/0066550 A1* | 3/2012 | Keum | G06F 11/3672 714/38.1 |
| 2014/0129002 A1* | 5/2014 | Brandes | G05B 19/0426 700/83 |
| 2015/0193324 A1* | 7/2015 | McGrath | H04L 41/082 717/127 |
| 2015/0347759 A1* | 12/2015 | Cabrera | H04L 63/1425 726/25 |
| 2019/0196952 A1* | 6/2019 | Manchiraju | G06N 3/088 |
| 2019/0228319 A1* | 7/2019 | Gupta | G06N 5/04 |
| 2019/0243965 A1* | 8/2019 | Wei | G06F 9/461 |
| 2020/0125475 A1* | 4/2020 | Iyer | G06F 8/433 |

OTHER PUBLICATIONS

Şentürk, Şerafettin, et al., Model Driven Security in a Mobile Banking Application Context, ARES '19: Proceedings of the 14th International Conference on Availability, Reliability and Security, Aug. 2019, pp. 1-7, [retrieved on Aug. 2, 2022], Retrieved from the Internet: <URL:http://dl.acm.org/>.*

Schaad, Andreas, et al., TAM2: Automated Threat Analysis, SAC '12: Proceedings of the 27th Annual ACM Symposium on Applied Computing, Mar. 2012, pp. 1103-1108, [retrieved on Aug. 2, 2022], Retrieved from the Internet: <URL:http://dl.acm.org/>.*

Darren Pauli, "Mozilla project spits out threat modelling tool for sysadmins," Apr. 2015, theRegister.co.uk. Source: https://www.theregister.co.uk/2015/04/01/mozilla_project_spits_out_sys_admin_threat_modelling_tool/, pp. 1-5.

U.S. Appl. No. 15/996,361, filed Jun. 1, 2018, Raghuveer Ketireddy et al.

U.S. Appl. No. 16/238,762, filed Jan. 3, 2019, Raghuveer Ketireddy et al.

U.S. Appl. No. 16/174,092, filed Naga Venkata Sunil Alamuri et al.

David Benson, "Using AWS 2.0 icons to create free Amazon architecture diagram in draw.io" dated Aug. 10, 2016, pp. 1-7.

* cited by examiner

AUTOMATED CODE GENERATION USING ANALYSIS OF DESIGN DIAGRAMS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Examples of such systems include online merchants, internet service providers, corporate networks, cloud computing services, web-based hosting services, and so on. Complex systems may include many applications and services that interact with one another in varied ways. For example, a web server may receive requests for web pages and use a complex set of interrelated services to build those requested pages.

Figure 1A:
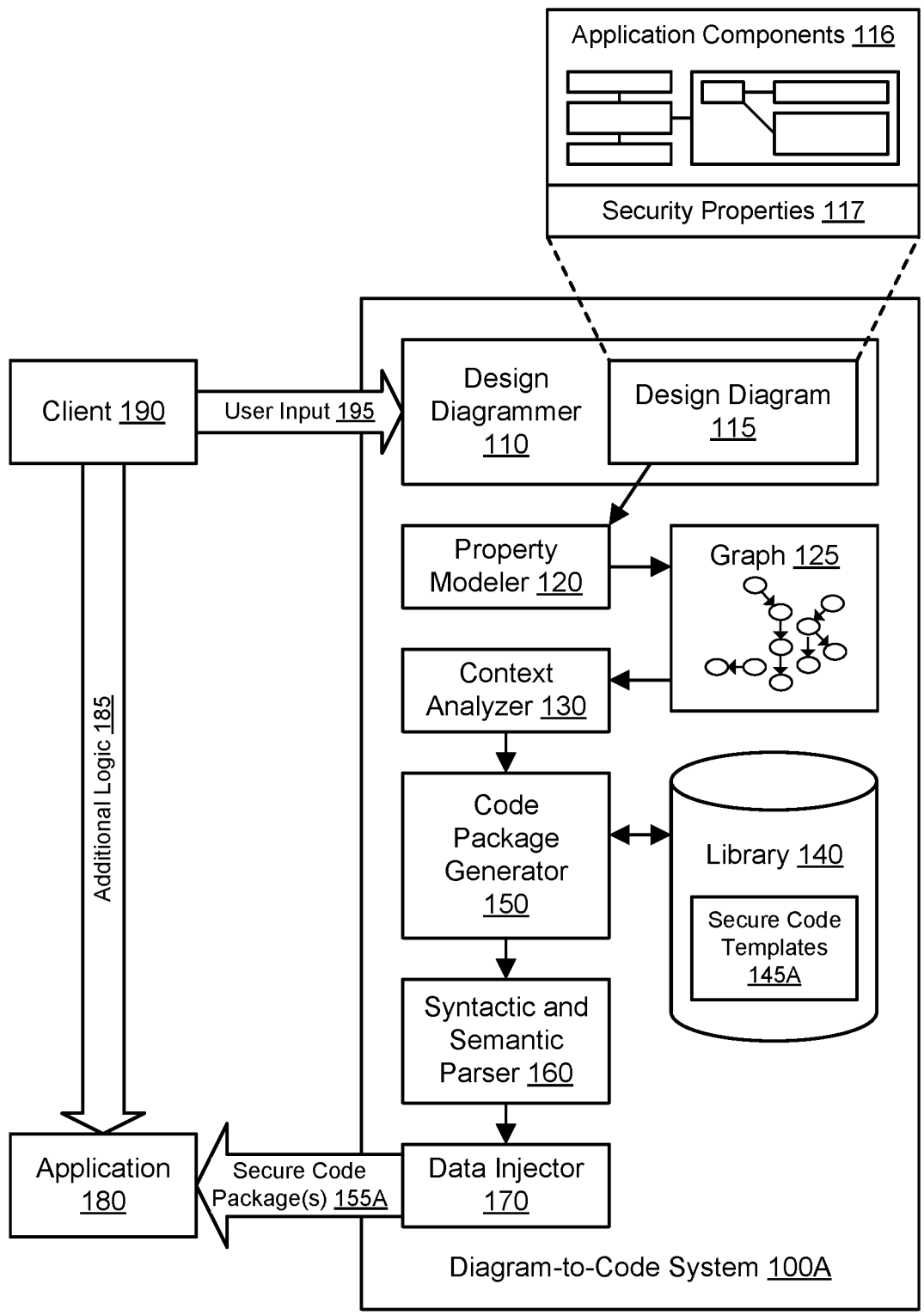
FIG. 1A, FIG. 1B, and FIG. 1C illustrate an example system environment for automated code generation using analysis of design diagrams, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for automated secure code generation using analysis of design diagrams are described. Applications may involve numerous components that interact with each other in complex ways, particularly in cloud-based provider networks that offer a wide variety of services and resources such as compute virtualization, storage virtualization, serverless computing, and so on. Using prior approaches for application development, developers often spent a significant amount of time in manually implementing security controls. Developers may have needed to read extensive documentation about security controls related to their components, e.g., to understand the different ways that access to a storage bucket of a virtualized storage service can be authenticated. Additionally, developers may have needed to try different permutations of security controls to achieve the desired level of security. Developers may have needed to manually write, validate, and test program code to implement a selected security control. For example, to implement message-level encryption for sending credit card data, a developer may have needed to write code to implement key generation, envelope encryption to encrypt the data, and sending the encrypted data over the network. Even after all this time and effort, the resulting manually written code may not be sufficiently secure. For example, code for securing passwords by using encryption instead of one-way hashing may be vulnerable to security threats.

The aforementioned challenges, among others, are addressed by embodiments of the techniques described herein, whereby automated techniques may be used to generate secure, policy-compliant, and/or performant code packages for infrastructure of software products. Software products may include executable program code such as applications, services, components of applications, components of services, and so on. Code packages may be generated by a diagram-to-code system based (at least in part) on automated analysis of software design diagrams and security properties of components or interactions between components. A developer may model an application in a diagramming tool by selecting and arranging diagram elements that represent components of an application. The developer may also enter security properties of components or their interactions, or the system may apply default properties in the absence of sufficient user input. For example, if a first serverless compute service is intended to store sensitive data in a second storage service, then the security properties may include a function that the first service uses to perform authentication along with a bucket name in which data will be stored by the second service. The data plane of the application may be modeled as a property graph that the diagram-to-code system may build using analysis of the diagram components and the corresponding security properties.

Based (at least in part) on analysis of this graph, the diagram-to-code system may produce code packages that are customized for particular applications and their context. The diagram-to-code system may generate particular code packages using parameterization of code templates and/or a neural network that has been trained using code templates. The code packages may include security controls that mitigate or eliminate known security threats, vulnerabilities, or other security-related flaws that might be present in software products in the absence of the automated secure code generation. Security controls may be specific to particular types of components identified in the application via the software design diagram as well as the context of those components. For example, the same type of message-level encryption may be used for sending bulk credit card data and also for sending sensitive personal identification numbers, but the context of these two use cases may require different implementations or parameters of the encryption technique. The code packages may enforce or represent compliance with one or more policies, e.g., for handling sensitive data securely or otherwise complying with applicable laws, regulations, industry standards, or organizational policies. The code packages may represent infrastructure best practices and may improve the availability, scalability, or other aspects of performance of the application. The code packages may be validated for proper syntax and semantics, and the code packages may be tested using data injection. The resulting code packages may include hooks at which the developer may add business logic. Using the diagram-to-code system, application development may be accelerated while known security threats are automatically remediated, mitigated, or eliminated.

Using the techniques described herein for automated code generation using analysis of design diagrams, the software design process may be improved and may produce software components of a higher quality. As one skilled in the art will appreciate in light of this disclosure, embodiments may be capable of achieving certain technical advantages, including some or all of the following: (1) reducing the use of computers, storage, and networks for application development by accelerating the development process using automated code generation; (2) improving the security of software products by using automated secure code generation that implements security controls for components in software design diagrams; (3) improving the policy compliance of software products by automated application of best practices related to policy compliance of components in software design diagrams; (4) improving the availability, scalability, or other aspects of the performance of software products by automated application of best practices related to performance of components in software design diagrams; and so on.

Figure 1B:
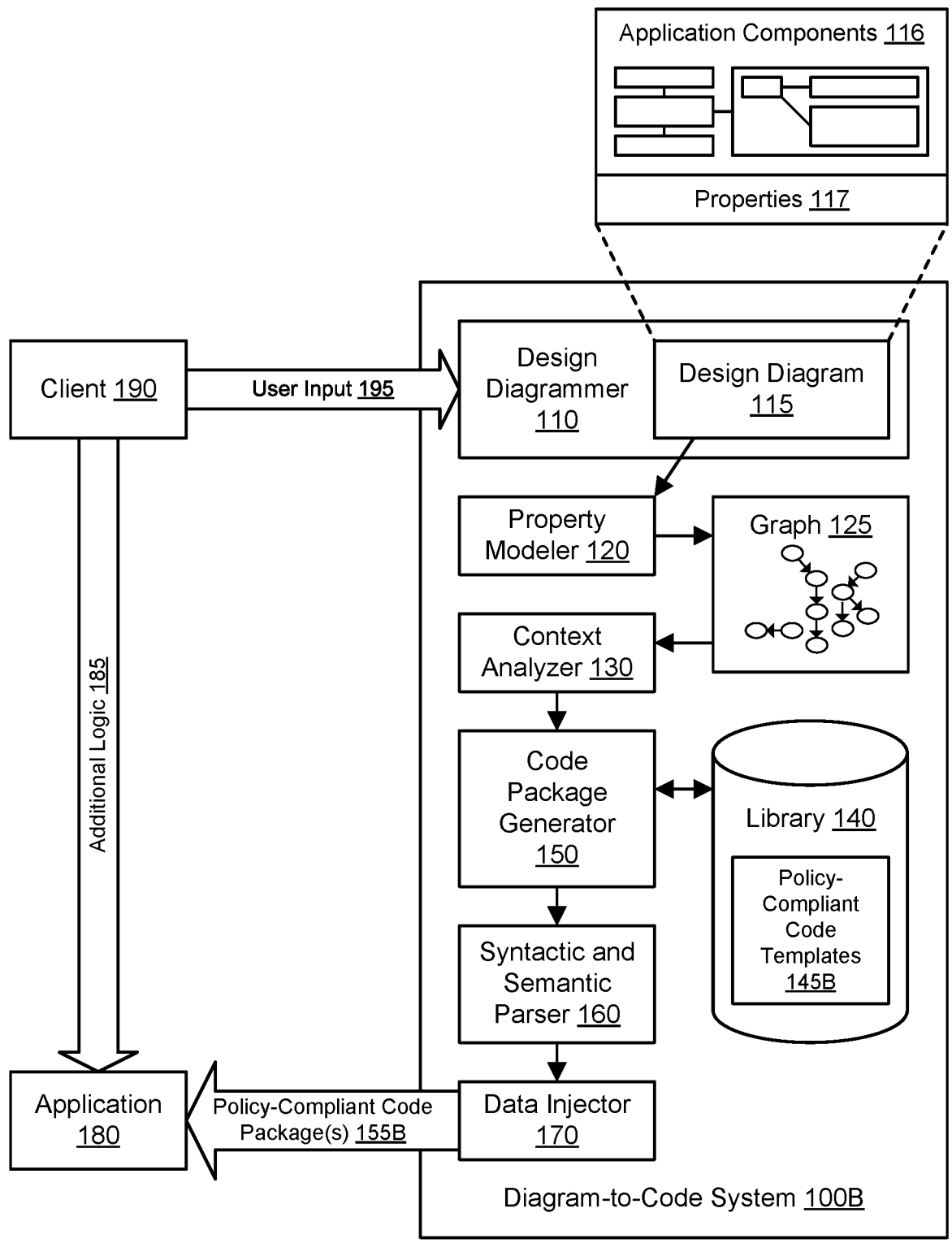
Figure 1C:
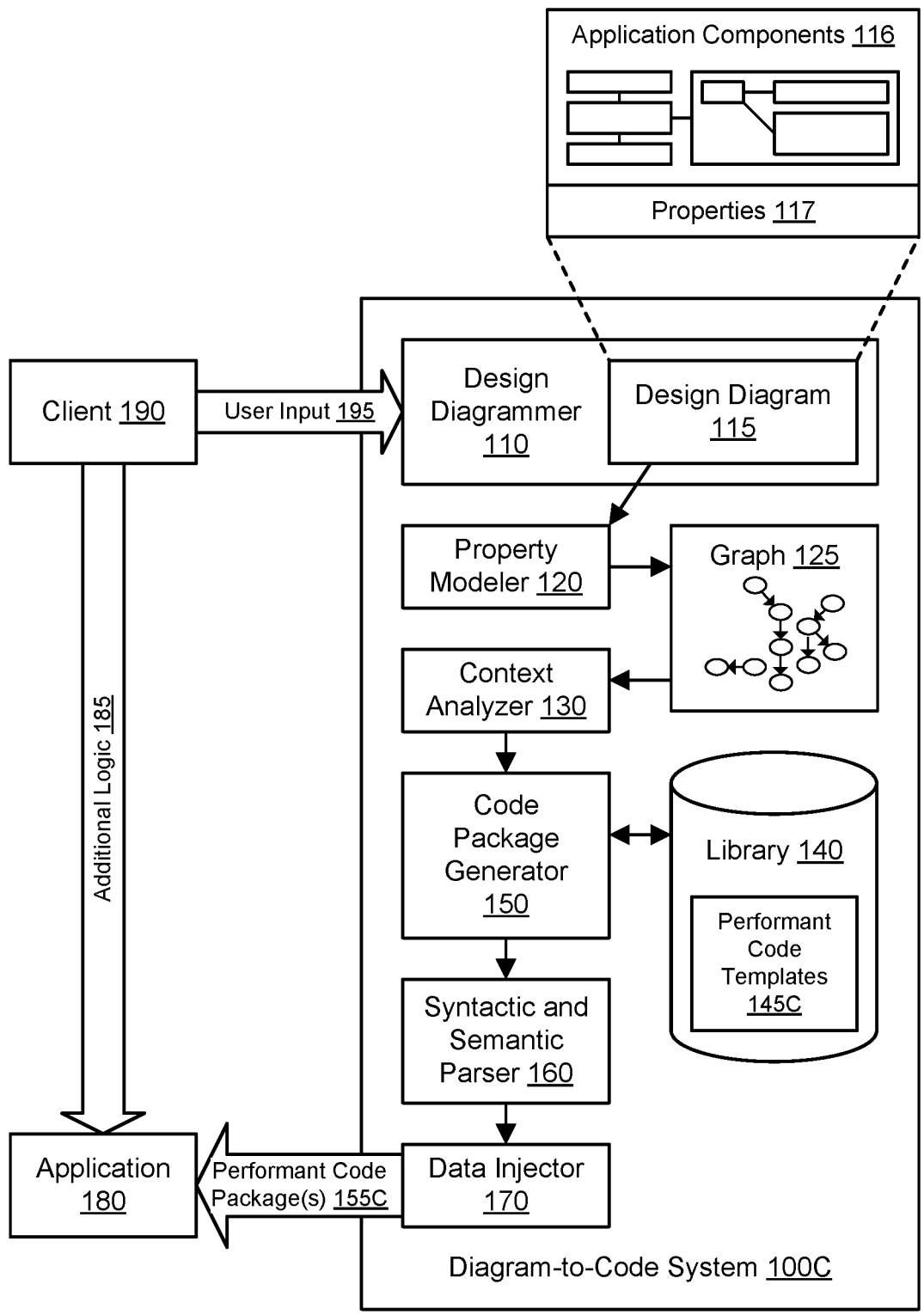

FIG. 1A, FIG. 1B, and FIG. 1C illustrate an example system environment for automated code generation using analysis of design diagrams, according to some embodiments. As shown in FIG. 1A, a diagram-to-code system 100A, also referred to as a secure code generator, may transform a software design diagram with security properties into code packages 155A that are secure against known threats, vulnerabilities, and other flaws. As shown in FIG. 1B, a diagram-to-code system 100B may transform a software design diagram with corresponding properties into code packages 155B that are compliant with policies (e.g., for handling sensitive data). As shown in FIG. 1C, a diagram-to-code system 100C may transform a software design diagram with corresponding properties into code packages 155C that achieve improved performance of applications. Users (e.g., application developers) may provide design diagrams for applications or other software products. Code packages may be generated by the diagram-to-code system 100A-100C based (at least in part) on automated analysis of software design diagrams and security properties of components or interactions between components. A developer may model an application in a diagramming tool by selecting and arranging diagram elements that represent components of an application. The developer may also enter security properties of components or their interactions, or the system may apply default properties in the absence of sufficient user input. The data plane of the application may be modeled as a property graph that the diagram-to-code system 100A-100C may build using analysis of the diagram components and the corresponding security properties. The diagram-to-code system 100A may generate one or more code packages that implement security controls for one or more components of a design diagram. The security controls may implement at least a portion of the infrastructure of the application. An application's infrastructure may enable and provide support for the business logic of the application, e.g., by integrating various services and resources such as virtualized storage, serverless computing, and so on. The diagram-to-code system 100B may generate one or more code packages 155B that enforce or represent compliance with one or more policies, e.g., for handling sensitive data securely or otherwise complying with applicable laws, regulations, industry standards, or organizational policies. The diagram-to-code system 100C may generate one or more code packages 155C that represent infrastructure best practices and improve the availability, scalability, or other aspects of performance of the application. In some embodiments, the diagram-to-code system 100A-100C may output templates usable to deploy compute instances and other resources to cloud computing environments.

In some embodiments, users may employ a software design diagrammer 110 to create and edit design diagrams. The design diagrammer 110 may be configured to generate design diagrams associated with software products and components of software products. Software products may include executable program code such as applications, services, components of applications, components of services, and so on. The terms "application" and "service" may be used interchangeably herein. Components 116 of software products may include executable programs (e.g., applications, services, packages, and so on), configurations of programs, storage resources (e.g., as managed by network-accessible storage services), configurations of storage resources, database tables, execution environments, hosts or other computing devices, network devices (e.g., routers and load balancers), network entities (e.g., virtual private clouds), abstractions such as host classes, containers, tasks submitted to program execution services, other network-accessible services, and so on. Design diagrams may represent such components 116 and their relationships as design elements. Design diagrams may include architecture diagrams, dataflow diagrams, sequence diagrams, class diagrams, state machine diagrams, use case diagrams, and so on. In some embodiments, the design diagrammer 110 may implement a graphical user interface (GUI) by which users may add components and relationships, edit components and relationships, delete components and relationships, select generic component types for inclusion in diagrams, customize generic component types, specify security properties of components, and so on. In some embodiments, design diagrams may be provided to the diagram-to-code system 100A-100C via another interface, e.g., via an application programming interface (API) by a client 190 that represents another system or service.

To generate a particular design diagram 115 for an application 180, the design diagrammer 110 may accept user input 195 from a client computing device 190. For example, the user input 195 may represent selection of various design elements, placement of the design elements on a two-dimensional (e.g., Cartesian) plane having x and y axes, configuration data and other metadata for design elements, labels and annotations for design elements, and so on. The user input 195 may be entered via a graphical user interface (GUI). The GUI may display a visualization of the design diagram 115. In one embodiment, the GUI may be generated (at least in part) by the design diagrammer 110 and may include conventional GUI elements such as windows, sub-windows or panes, buttons, scrollbars, and so on. The GUI may be configured to solicit the user input 195. In one embodiment, the client 190 may represent a client computing device operated by an end user, and the GUI may be displayed on a display device associated with the client device. Based on user input 195 representing modifications to the design diagram 115, the design diagrammer 110 may generate a modified version of the diagram and display the modified diagram in the GUI. In some embodiments, a user may provide a design diagram 115 without necessarily using the GUI. For example, the user may scan a hand-drawn diagram to produce a flat image, and the design diagrammer 110 or another component may convert that image into a more complex data structure having discrete design elements.

In some embodiments, users may select pre-approved design templates for common application types. Pre-approved design templates may represent best practices for security, for policy compliance according to internal or organizational standards and/or industry-wide standards, and/or for improving performance (e.g., scalability or availability). Components of the design templates may be associated with security controls that mitigate or remediate known security threats. For example, if the user is seeking to design a web server, the user may select a secure design template for web servers that implements a secure infrastructure (e.g., including a default authorization technique for administrative access) without necessarily specifying business logic of the web server. As another example, if the user is seeking to design an application that handles healthcare data, the user may select a healthcare-related design template in which the sensitive data is always stored in an encrypted form for compliance with a HIPAA policy. As an additional example, the user may select a performant design template for an application server that implements high availability or high scalability. Users may then edit the design templates, e.g., by adding or removing components, changing labels or other metadata of components, adding relevant security properties such as specific addresses of servers and storage resources, and so on. Similarly, in some embodiments, users may select generic design elements for common component types. For example, users may select components representing common storage services within a provider network, common serverless compute services, common compute virtualization services, common edge computing services, and so on. Users may change labels, security properties, or other metadata for such generic components in the user interface of the design diagrammer 110.

Based (at least in part) on the components represented in the diagram 115 and their relationships, the diagram-to-code system 100A-100C may identify security properties 117 or other properties that should be specified in order for customized code to be generated automatically. In some embodiments, the diagram-to-code system 100A-100C may solicit such properties 117 from a developer, e.g., by presenting appropriate prompts in a user interface and receiving user input 195 responsive to the prompts that represents specific values of the properties 117. In some embodiments, users may supply properties without being prompted by the diagram-to-code system 100A-100C. An example of security properties 117 will be discussed further with respect to FIG. 2.

In some embodiments, the diagram-to-code system 100A-100C may include a property modeler 120. Using the property modeler 120, elements of a design diagram 115 may be converted to a graph representation referred to as a property graph 125. The property graph 125 may represent the data plane of the application using nodes for application components 116 and edges for relationships between components. The graph representation may include one or more graphs or sub-graphs. The graph representation may represent properties 117 and other relevant context and may be referred to as a property graph. The graph 125 may include a plurality of nodes (or vertices) representing software components 116 and a plurality of edges representing relationships between software components. The nodes and edges may represent the design elements. For example, a service may be represented using one node, a storage resource may be represented using another node, and an edge between the two nodes may represent the use of the storage resource by the service for storage and/or retrieval of data. In one embodiment, each of several graphs may represent components of a particular application 180. In one embodiment, sub-graphs within a graph may represent different functionalities of the application 180. The edges may include directed edges. In one embodiment, the graph 125 may include one or more directed acyclic graphs. The relationships may include relationships between components of a single application and/or relationships from one application to another application. The graph 125 may capture a complex web of intra-application and inter-application relationships in an enterprise, such that different portions of the graph (sub-graphs) may represent different applications or services. In one embodiment, some portions of the graph 125 may be unconnected to (and unreachable by) other portions of the graph, e.g., if the unconnected nodes are not depicted with formal relationships in the design diagram 115.

In some embodiments, the graph 125 may include properties 117 that are relevant to generating customized code packages associated with using those components. In one embodiment, the graph 125 may include metadata for individual nodes and edges, and the metadata may indicate unique node identifiers, unique edge identifiers, node types, edge types, and so on. The metadata may describe security properties 117 such as authentication properties, authorization properties, access control properties, encryption properties, datatype properties, and so on. User input 195 specifying the properties 117 may be solicited from the user (e.g., via a GUI of the design diagrammer 110), or default properties (e.g., authentication methods for particular component types) may be selected by the diagram-to-code system 100A-100C in the absence of sufficient user input. In one embodiment, the graph 125 may include spatial metadata for nodes and edges representing coordinates extracted from the design diagram 115. Using such metadata, each node and/or edge may be uniquely identified in the graph 125. In one embodiment, additional metadata may be stored outside of the graph 125, e.g., in a storage service at a location or key associated with a node or edge in a graph itself. For example, contact information for an owner of a node may be stored external to the graph 125, e.g., in a database or storage service, and such information may be retrievable using a key or other identifier stored within the graph.

The diagram-to-code system 100A-100C may analyze the property graph 125 to extract the relevant context that is usable to generate security controls or other controls for application components. In some embodiments, the diagram-to-code system 100A-100C system may include a context analyzer 130. The context analyzer 130 may capture the relevant security context of the application, e.g., based (at least in part) on graph analysis of the property graph 125 of the application. For example, if the property graph 125 includes a first node representing a function to be performed by a serverless compute service and a connected second node representing a storage service, then the context analyzer 130 may determine that the specified storage bucket of the storage service will be used as a source for retrieving program code from a code repository, that a particular authentication technique will be used to protect the code at the serverless compute service, and that the application will be deployed at a particular edge location in a multi-tenant, cloud-based provider network. The context analyzer 130 may determine that the storage bucket does not have role-based authentication enabled, but access to the bucket is restricted using the authentication technique at the serverless compute service.

In some embodiments, the graph representation may be traversed by the context analyzer 130, node by node or sub-graph by sub-graph, such that every element is evaluated with respect to one or more rules. The rules may be written by developers to detect a security context of an application. In some embodiments, the rules may be used to determine whether software products are in compliance with best practices, e.g., to protect against security threats and vulnerabilities. In applying a rule to a sub-graph, metadata about nodes and edges may be extracted from the graph and used to determine whether the rule matches any portion of the sub-graph. The metadata may describe properties such as authentication properties, authorization properties, access control properties, datatype properties, and so on. Micro-traversals to apply rules or policies to sub-graphs may automate data-gathering and decision-making operations such as determining what a component does, determining what kind of data the component has, determining where the data is sent or stored, determining what protections are on the handling of the data, determining who has access to the hosts where code or data is located, and so on.

In some embodiments, the diagram-to-code system 100A-100C may include a library 140 for code templates. As shown in FIG. 1A, a library 140 may store a set of security controls that represent security best practices for mitigating or eliminating known security threats, vulnerabilities, or other flaws. For example, the security controls may implement secure approaches for authentication, access control, data in transit protection, data at rest protection, monitoring, and so on. Individual controls may be represented in the library 140 by code templates 145A that include program code for implementing the corresponding controls. In some embodiments, as shown in FIG. 1B, a library 140 may store controls that implement compliance with policies, e.g., to ensure that sensitive data is handled consistent with the requirements of standards such as HIPAA and PCI DSS. Individual controls may be represented in the library 140 by policy-compliant code templates 145B that include program code for implementing the corresponding controls. In some embodiments, as shown in FIG. 1C, a library 140 may store controls that implement performance best practices, e.g., for improving the availability or scalability for common application architectures. Individual controls may be represented in the library 140 by performant code templates 145C that include program code for implementing the performance best practices for application infrastructure. Individual controls may be selected from the library 140 by the diagram-to-code system 100A-100C for particular components of the application. One or more controls may be selected based (at least in part) on component types of the components 116, and the selected control(s) may represent secure approaches associated with the component types of the components or approaches for ensuring policy compliance or improving performance. For example, a particular authentication control suitable for use with a particular component type may be selected from a set of authentication controls approved for use with that component type. The library 140 may be queried by the diagram-to-code system 100A-100C to return appropriate code templates for the corresponding controls, e.g., using contextual information determined by the property modeler 120 and/or context analyzer 130. In some embodiments, particular code templates may be pre-assigned to particular components in pre-approved design templates selected by users. In some embodiments, security controls in the library 140 may be classified in categories such as gate-based controls, proxy-based controls, and wrapper-based controls.

A gate-based control may act as a gate for a security check. Many authentication controls and access controls may fall under the gate-based category. For example, role-based user authentication for a storage bucket may represent a gate-based control. Via the security control library 140, the diagram-to-code system 100A may have access to code templates for a large number of gate-based controls. In some embodiments, these code templates may be queried based (at least in part) on component name, security control, and relationship with other components in order to retrieve the most relevant code templates from the security control library.

A proxy-based control may be implemented in a proxy-type pattern in a manner that is substantially independent of other components. For example, an interceptor component may act as a proxy by intercepting user requests and checking the intercepted requests for authentication. The proxy-based controls may be perform specific functionality and may be integrated with other application components. Via the security control library 140A, the diagram-to-code system 100A may have access to code templates for commonly used proxy-based controls.

A wrapper-based control may transform the data that is passed to it. A wrapper-based control may represent a wrapper on top of the data. Encryption controls such as symmetric key encryption and asymmetric key encryption may fall under the wrapper-based category. Via the security control library 140A, the diagram-to-code system 100A may have access to code templates for wrapper-based controls, and these code templates may be designed to take data from a source and return the transformed data.

In some embodiments, the diagram-to-code system 100A-100B may include a code package generator 150. The code package generator 150 may be triggered based (at least in part) on user input, e.g., when the user seeks to generate code for the design diagram 115. The code package generator 150 may fetch code templates 145A from the security control library 140A, inject context information into the code templates, and produce code package(s) 155A implementing security control(s) for components 116 depicted in the design diagram 115. In some embodiments, the code package generator 150 may fetch code templates 145B from the control library 140B, inject context information into the code templates, and produce code package(s) 155B that implement application infrastructure in a manner compliant with one or more policies. In some embodiments, the code package generator 150 may fetch code templates 145C from the control library 140C, inject context information into the code templates, and produce code package(s) 155C that implement application infrastructure in a manner that achieves a higher degree of availability, scalability, or other performance characteristics of the application.

In some embodiments, the code generator 150 may generate particular code packages 155A-155C using parameterization of secure code templates. To inject context information through parameterization, the code generator 150 may use code templates that are generic enough to solve common use cases by updating the templates with few parameters so that the code will be relevant for the control. For example, the interceptor function at a serverless compute service may represent a generic code template, and the security control generator may know how to invoke this interceptor for the particular context of the application. The context analyzer 130 may provide information about this interceptor function. The code generator 150 may generate program code to invoke the interceptor function at the serverless compute service when a request is received at the edge location of the application to retrieve data from an additional service. The invoked function may perform authentication for a class of users in order for the requested data to be retrieved.

In some embodiments, the code generator 150 may generate particular code packages 155A-155C using machine learning techniques such as a neural network, e.g., that has been trained to output secure code using a training set of secure code templates. The neural network may represent a recurrent neural network. Based (at least in part) on code templates and context information, the neural network may output one or more code packages 155A-155C. When new context information is provided, the trained neural network may generate relevant code for that context based on the new context information. For example, for an encryption at rest security control that is trying to encrypt credit card information and storing it in a particular data store, the neural network may take a code template for encryption at rest along with credit card information to generate code that encrypts the credit card information and returns the encrypted blob to be stored in the data store.

The code packages 155A-155C produced by the diagram-to-code system 100A-100C may be compilable but may lack the specific business logic 185 of the application 180. The code packages 155A-155C produced by the diagram-to-code system 100A-100C may include hooks at which developers can insert their additional (business) logic 185. In some embodiments, due to the incompleteness of the code packages from the lack of specific business logic 185, traditional compilers may not be usable to perform validation of the code 155A-155C. In some embodiments, the diagram-to-code system 100A may include a parser 160 that validates code packages 155A-155C for proper syntax and semantics. The parser 160 may be implemented using a modified compiler to determine whether or not the code packages 155A-155C have proper syntax and semantics.

In some embodiments, the diagram-to-code system 100A-100C may test code packages 155A-155C using data injection. A data injector 170 may gather test data from a developer. The data injector 170 may inject the test data into the generated code and run the code to validate it. In some embodiments, in order to inject the test data, the data injector 170 may use a modified compiler to compile the portions of the code that implement the controls. For example, if the code generated is for encrypting personal ID numbers, then the diagram-to-code system 100A may takes the key information and test ID number information and output the encrypted ID number information. Using this information, the diagram-to-code system 100A-100C may validate that the code implemented the control properly.

In some embodiments, the diagram-to-code system 100A-100C may output user-readable documentation associated with code packages 155A-155C. The documentation may be labeled as one or more README guides. The documentation may provide information and resources on further customizability, development, deployment, operational maintenance, and/or other aspects of using the code packages 155A-155C. For example, the documentation may instruct the developer to add additional (business) logic 185 at the provided hooks in the secure code packages 155A.

The code packages 155A-155C may be provided to a developer associated with the client 190. The developer may add business logic 185 at the hooks in the secure code 155A-155C and compile the combination into a compiled application (or compiled software product). In some embodiments, the developer may deploy the application 180 into any suitable execution environment consistent with the security controls. When the application is executed, the automatically generated security controls may remediate, mitigate, or eliminate known security threats or vulnerabilities to which the application might be vulnerable without the secure code packages 155A. In some embodiments, when the application is executed, the automatically generated controls may eliminate policy non-compliance to which the application might be vulnerable without the code packages 155B. In some embodiments, when the application is executed, the automatically generated controls may improve application performance using the code packages 155C. By automating much of the time-consuming manual effort of researching, coding, and testing security controls, the diagram-to-code system 100A-100C may improve the security, policy compliance, and/or performance of the application 180 while accelerating the process of developing the application.

Figure 6:
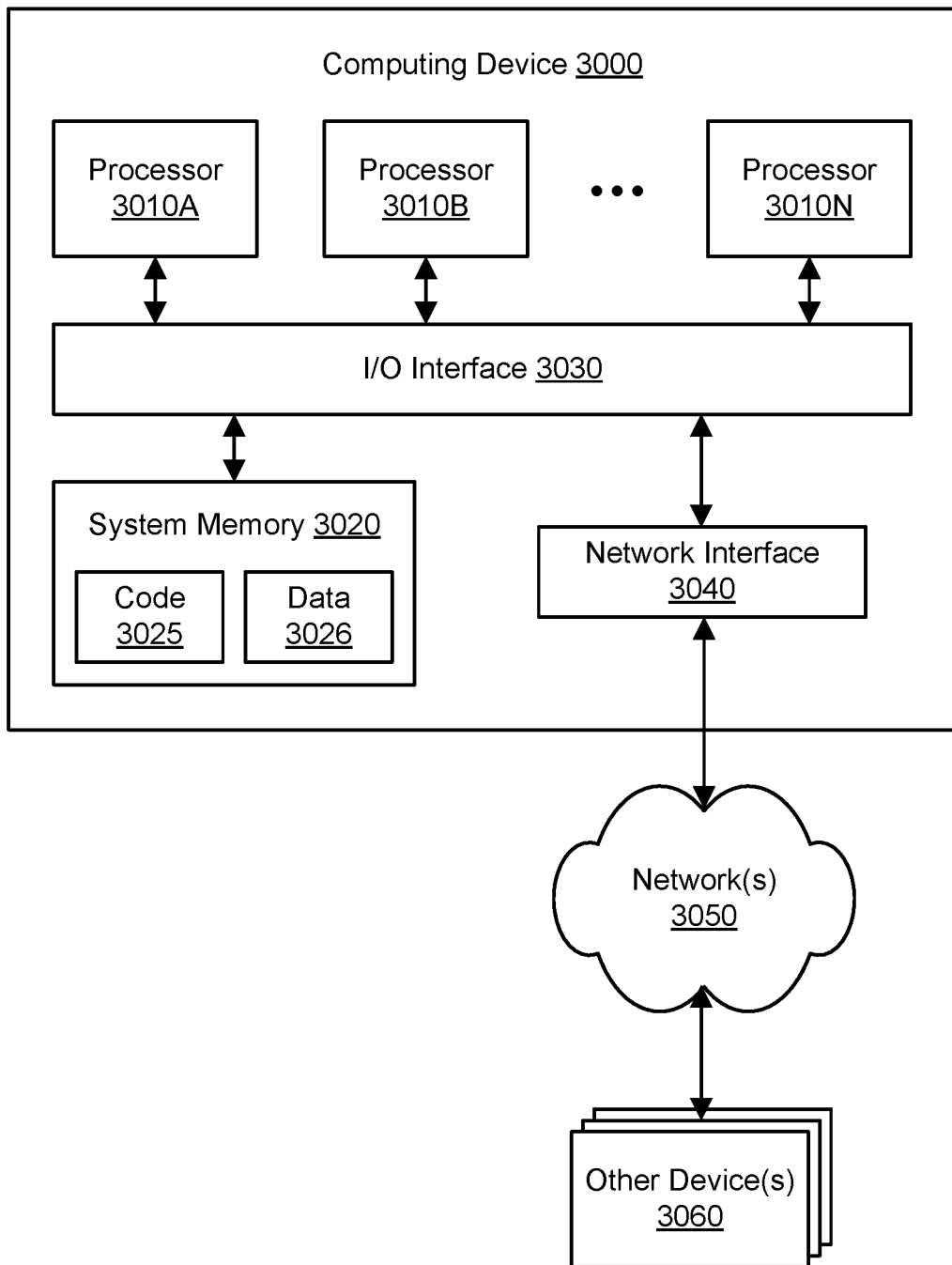
FIG. 6 illustrates an example computing device that may be used in some embodiments.

The system 100A-100C may be implemented using any suitable number and configuration of computing devices, any of which may be implemented by the example computing device 3000 illustrated in FIG. 6. The computing devices may be located in any suitable number of data centers or geographical locations. In various embodiments, at least some of the functionality of the system 100A-100C may be provided by the same computing device or by different computing devices. If any of the components of the system 100A-100C are implemented using different computing devices, then the components and their respective computing devices may be communicatively coupled, e.g., via one or more networks. Each of the components of the system 100A-100C may represent any combination of software and hardware usable to perform their respective functions, as discussed as follows. Operations implemented by the system 100A-100C may be performed automatically, e.g., without a need for user initiation or user intervention after an initial configuration stage, and programmatically, e.g., by execution of program instructions on at least one computing device. It is contemplated that the system 100A-100C may include additional components not shown, fewer components than shown, or different combinations, configurations, or quantities of the components shown.

The system 100A-100C may be implemented in a service-oriented system in which multiple services collaborate according to a service-oriented architecture. In such an environment, the system 100A-100C may offer its functionality as service to multiple clients. A service may be implemented using a plurality of different instances that are distributed throughout one or more networks, and each instance may offer access to the functionality of the corresponding service to various clients. It is contemplated that any suitable number and configuration of clients may interact with the system 100A-100C. To enable clients to invoke its functionality, the system 100A-100C may expose any suitable interface(s), such as one or more APIs or other programmatic interfaces and/or graphical user interfaces (GUIs). In one embodiment, the functionality of the system 100A-100C may be offered to clients in exchange for fees.

A client computing device 190 may convey network-based service requests to the system 100A-100C via one or more networks. In various embodiments, the network(s) may encompass any suitable combination of networking hardware and protocols necessary to establish network-based communications between the client 190 and the system 100A-100C. For example, the network(s) may generally encompass the various telecommunications networks and service providers that collectively implement the Internet. The network(s) may also include private networks such as local area networks (LANs) or wide area networks (WANs) as well as public or private wireless networks. For example, both the client 190 and the system 100A-100C may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the client 190 and the Internet as well as between the Internet and the system 100A-100C. It is noted that in some embodiments, the client 190 may communicate with the system 100A-100C using a private network rather than the public Internet.

In one embodiment, aspects of the system 100A-100C may be implemented using computing resources of a provider network. A provider network may represent a network set up by an entity such as a business or a public-sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

In some embodiments, an operator of the provider network may implement a flexible set of resource reservation, control, and access interfaces for their clients. For example, a resource manager may implement a programmatic resource reservation interface (e.g., via a web site or a set of web pages) that allows clients (potentially including other components within the provider network) to learn about, select, purchase access to, and/or reserve compute instances offered by the provider network. Such an interface may include capabilities to allow browsing of a resource catalog and provide details and specifications of the different types or sizes of resources supported, the different reservation types or modes supported, pricing models, and so on.

Figure 2:
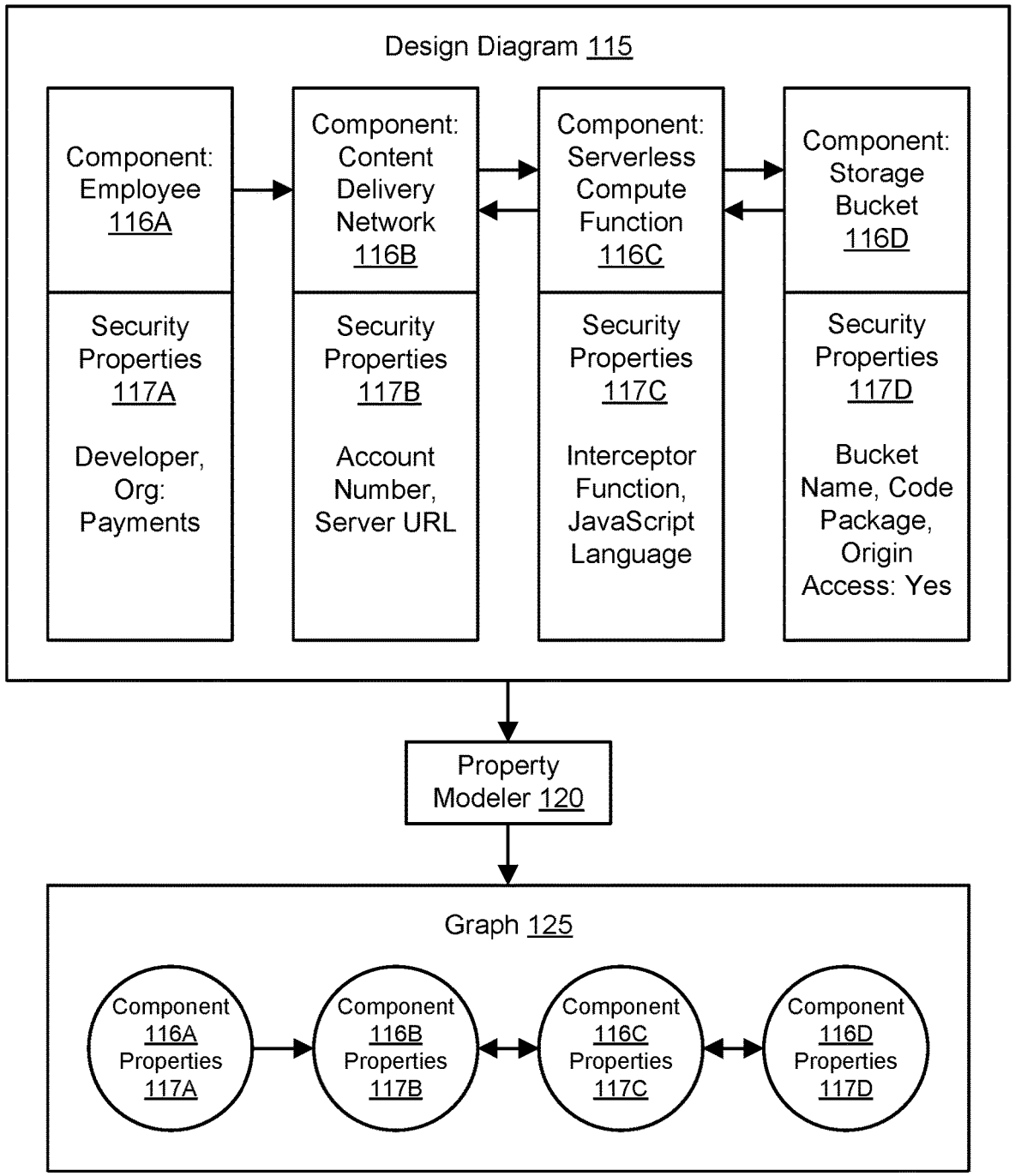
FIG. 2 illustrates further aspects of the example system environment for automated code generation using analysis of design diagrams, including an example of application components and their context, according to some embodiments.

FIG. 2 illustrates further aspects of the example system environment for automated code generation using analysis of design diagrams, including an example of application components and their context, according to some embodiments. The design diagram 115 may indicate a set of application components 116A, 116B, 116C, and 116C and their relationships. In the illustrated example, component 116A represents an employee of the entity that offers the provider network, component 116B represents a content delivery network (CDN) comprising one or more edge locations (locations that reduce latency for interacting with real-world clients), component 116C represents a function to be executed in the cloud by a serverless compute service (that manages its own compute resources on behalf of clients who request execution of functions), and component 116D represents a storage bucket (or other storage location) hosted in the cloud by a storage service. The multi-tenant provider network may implement the CDN, serverless compute service, and/or storage service using cloud-based resources.

Each of the illustrated components 116A-116D may have a set of security properties 117A-117D that relate to security controls for the corresponding application 180. The security properties 117A-117D may be specified by user input 195 and/or determined programmatically by the system 100A based (at least in part) on default values and/or context. For example, the employee component 116A may have security properties 117A indicating the employee's role as a developer and the employee's organizational membership in a payments organization of the entity that offers the provider network. As another example, the CDN component 116B may have security properties 117B indicating the account number of an account with the provider network and a uniform resource locator (URL) or other address of an edge location of the CDN that implements the application 180. As a further example, the serverless compute component 116C may have security properties 117C indicating an interceptor function that performs authentication and a language (e.g., JavaScript) in which the function is written. As an additional example, the storage component 116D may have security properties 117D indicating the name of the storage bucket, the code package to be retrieved from the bucket, and permissions for origin access.

The components 116A-116D may be transformed into a property graph 125 based (at least in part) on analysis of the diagram 115 by the property modeler 120. The graph 125 may indicate that the employee accesses the CDN at the specified URL using the specified account number, the CDN requests that the serverless compute service execute the specified interceptor function to perform authentication, and the specified code package is retrieved from the specified storage bucket if the employee's access attempt is authenticated by the interceptor function. The context analyzer 130 may determine that the storage bucket does not have role-based authentication, but its access is restricted using the interceptor function. The secure code package(s) may implement such a proxy-based security control using at least some of the security properties 117A-117D.

Figure 3:
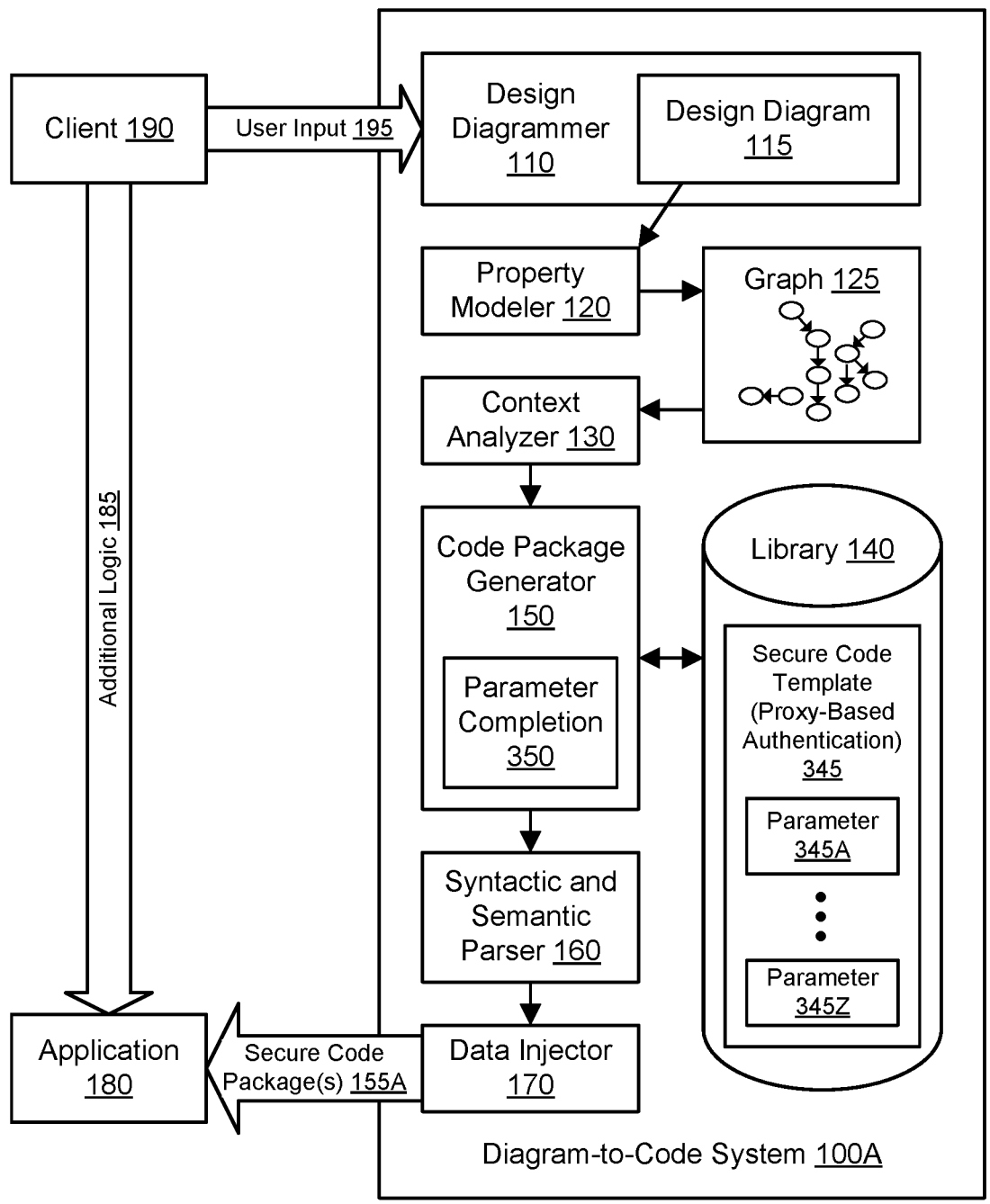
FIG. 3 illustrates further aspects of the example system environment for automated code generation using analysis of design diagrams, including generating secure code packages using parameterization of secure code templates, according to some embodiments.

FIG. 3 illustrates further aspects of the example system environment for automated code generation using analysis of design diagrams, including generating secure code packages using parameterization of secure code templates, according to some embodiments. In some embodiments, the code generator 150 may generate particular code packages using parameterization of code templates. To inject context information through parameterization, the security control generator may use code templates that are generic enough to solve common use cases by updating the templates with few parameters so that the code will be relevant for a security control. For example, the interceptor function for proxy-based authentication by a serverless compute service may be represented by a generic code template 345 that includes parameters 345A-345Z, and the code generator 150 may know how to invoke this interceptor for the particular context of the application 180. The context analyzer may provide information usable to select this interceptor function via the template 345. The code generator 150 may perform parameter completion 350 to complete the template 345 by adding values of some of the security properties 117 to the parameters 345A-345Z, e.g., the location of the storage bucket to which access is to be authenticated. The code generator 150 may thus generate program code to invoke the interceptor function at the serverless compute service when a request is received at the edge location of the application. The invoked function may perform proxy-based authentication for access to a specified storage location, e.g., to retrieve program code for deployment to an edge location in a CDN.

Figure 4:
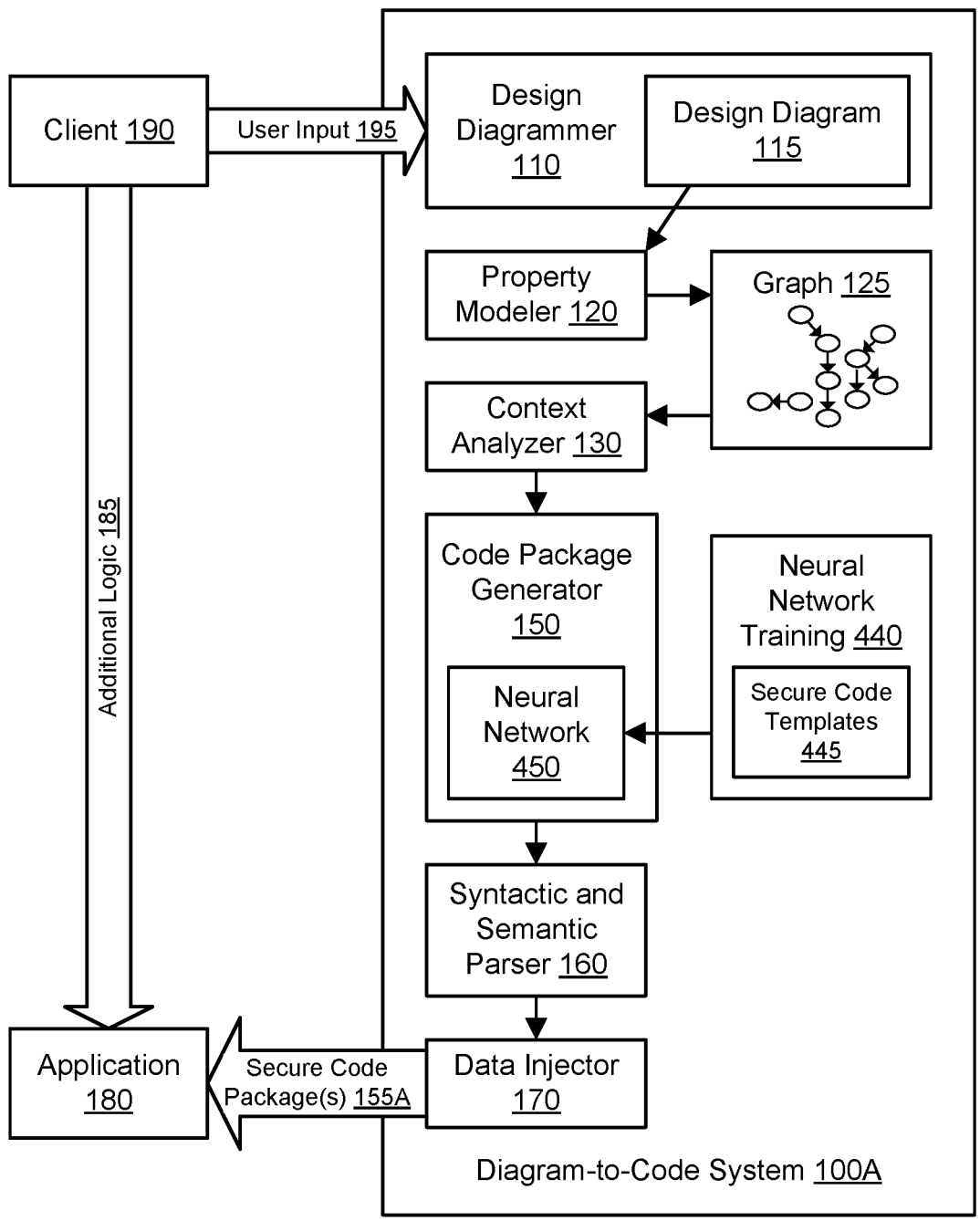
FIG. 4 illustrates further aspects of the example system environment for automated code generation using analysis of design diagrams, including generating secure code packages using a neural network, according to some embodiments.

FIG. 4 illustrates further aspects of the example system environment for automated code generation using analysis of design diagrams, including generating secure code packages using a neural network, according to some embodiments. In some embodiments, the code generator 150 may generate particular code packages using one or more machine learning techniques. Machine learning techniques may be implemented using one or more systems that learn from data, identify patterns, and make predictions or other decisions with minimal human intervention (e.g., after human input during an initial configuration phase such as model training). Machine learning may include generating and using one or more models that can programmatically output results (e.g., secure code packages) based (at least in part) on input (e.g., template selection and/or security properties). Such a model may undergo a training process 440 (e.g., using a training data set 445) such that it learns patterns sufficient to make inferences about future events.

The machine learning techniques may include a neural network 450 that has been trained by a training process 440 to output secure code using a training set of secure code templates 445. The neural network 450 may represent a recurrent neural network. Based (at least in part) on code templates and context information, the neural network 450 may output a secure code package. When new context information is provided, the trained neural network 450 may generate relevant code for that context based on the new context information. For example, for an encryption at rest security control that is trying to encrypt credit card information and storing it in a particular data store, the neural network 450 may take a code template for encryption at rest along with credit card information to generate code that encrypts the credit card information and return the encrypted blob to be stored in the data store.

Figure 5:
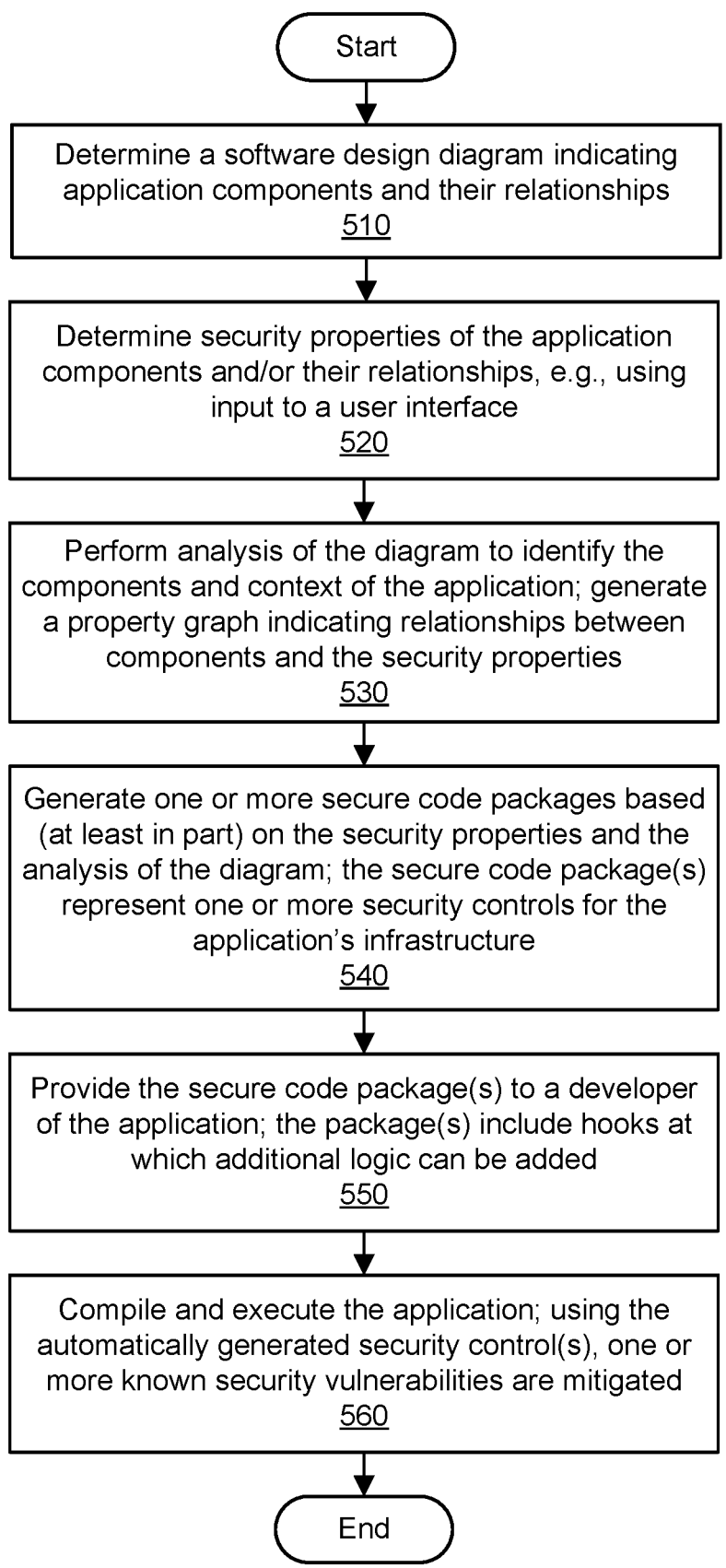
FIG. 5 is a flowchart illustrating a method for automated secure code generation using analysis of design diagrams, according to some embodiments.

FIG. 5 is a flowchart illustrating a method for automated code generation using analysis of design diagrams, according to some embodiments. As shown in 510, a software design diagram may be determined for an application. In some embodiments, a user may employ a software design diagrammer to create and edit the design diagram via user input. The design diagram may represent application components and their relationships as design elements. In some embodiments, the design diagrammer may implement a graphical user interface (GUI) by which users may add components and relationships, edit components and relationships, delete components and relationships, select generic component types for inclusion in diagrams, customize generic components types, specify security properties of components, and so on. In some embodiments, a user may provide a design diagram without necessarily using the GUI. For example, the user may scan a hand-drawn diagram to produce a flat image, and the design diagrammer or another component may convert that image into a more complex data structure having discrete design elements. In some embodiments, a user may select and potentially modify pre-approved secure design templates for common application types. Secure design templates may represent best practices for security and policy compliance according to internal or organizational standards and/or industry-wide standards. Components of the secure design templates may be associated with security controls that mitigate or remediate known security threats.

As shown in 520, security properties of the application components and/or their relationships may be determined. Security properties may include authentication properties, authorization properties, access control properties, datatype properties, user IDs, account IDs, server addresses, storage locations, and so on. User input specifying the security properties may be solicited from the user (e.g., via a GUI of the design diagrammer), or default security properties (e.g., authentication methods for particular component types) may be selected by the method in the absence of sufficient user input. In some embodiments, the user may supply security properties without being prompted.

As shown in 530, analysis of the diagram may be performed to identify the components and context of the application. The analysis may produce a property graph that captures the relationships between component and their security properties. The property graph may represents the data plane of the application using nodes for application components and edges for relationships between components. For example, a service may be represented using one node, a storage resource may be represented using another node, and an edge between the two nodes may represent the use of the storage resource by the service for storage and/or retrieval of data. The graph may include security properties that are relevant to generating secure code packages associated with using those components. The method may analyze the property graph to extract the relevant contextual information (e.g., the relationships between components and the security properties) that is usable to generate security controls for application components.

As shown in 540, one or more secure code packages may be automatically generated based (at least in part) on the security properties and based (at least in part) on the analysis of the design diagram, e.g., as reflected in the property graph. The secure code package(s) may represent program code for implementing one or more security controls for the application's infrastructure. The secure code package(s) may be customized for the context of the application, e.g., using specific values of the security properties such as account numbers, server addresses, storage locations, and so on. To generate the secure code package(s), one or more secure code templates may be selected from a security control library. One or more secure code templates that implement security controls may be selected based (at least in part) on component types of the components, and the selected security control(s) may represent secure approaches associated with the component types of the components. For example, a particular authentication control suitable for use with a particular component type may be selected from a set of authentication controls approved for use with that component type. A security control generator may fetch code templates from the security control library, inject context information into the code templates, and produce code that is relevant for security control(s) for components depicted in the design diagram. Similarly, one or more policy-compliant code packages may be automatically generated based (at least in part) on analysis of the design diagram, or one or more performant code packages may be automatically generated based (at least in part) on analysis of the design diagram.

In some embodiments, the secure code package(s) may be subjected to validation using a syntactic and semantic parser. In some embodiments, the secure code package(s) may be subjected to testing using test data injection. As shown in 550, the secure code package(s) may be provided to a developer of the application. The code packages produced by the method may be compilable but may lack the specific business logic of the application. The package(s) may include hooks at which business logic can be added by the developer. As shown in 560, the application (including both the secure code packages and the additional program code for implementing the business logic) may be compiled and executed. When the application is executed, one or more known security threats, vulnerabilities, or other flaws may be mitigated, remediated, or eliminated.

Illustrative Computer System

In at least some embodiments, a computer system that implements a portion or all of one or more of the technologies described herein may include a computer system that includes or is configured to access one or more computer-readable media. FIG. 6 illustrates such a computing device 600. In the illustrated embodiment, computing device 600 includes one or more processors 610A-610N coupled to a system memory 620 via an input/output (I/O) interface 630. Computing device 600 further includes a network interface 640 coupled to I/O interface 630.

In various embodiments, computing device 600 may be a uniprocessor system including one processor or a multiprocessor system including several processors 610A-610N (e.g., two, four, eight, or another suitable number). Processors 610A-610N may include any suitable processors capable of executing instructions. For example, in various embodiments, processors 610A-610N may be processors implementing any of a variety of instruction set architectures (ISAs), such as the x86, PowerPC, SPARC, or MIPS ISAs, or any other suitable ISA. In multiprocessor systems, each of processors 610A-610N may commonly, but not necessarily, implement the same ISA.

System memory 620 may be configured to store program instructions and data accessible by processor(s) 610A-610N. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 620 as code (i.e., program instructions) 625 and data 626. In the illustrated embodiment, system memory 620 also stores program code and data that implement aspects of the threat modeler 100 discussed above.

In one embodiment, I/O interface 630 may be configured to coordinate I/O traffic between processors 610A-610N, system memory 620, and any peripheral devices in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processors 610A-610N). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processors 610A-610N.

Network interface 640 may be configured to allow data to be exchanged between computing device 600 and other devices 660 attached to a network or networks 650. In various embodiments, network interface 640 may support communication via any suitable wired or wireless general data networks, such as types of Ethernet network, for example. Additionally, network interface 640 may support communication via telecommunications/telephony networks such as analog voice networks or digital fiber communications networks, via storage area networks such as Fibre Channel SANs, or via any other suitable type of network and/or protocol.

In some embodiments, system memory 620 may be one embodiment of a computer-readable (i.e., computer-accessible) medium configured to store program instructions and data as described above for implementing embodiments of the corresponding methods and apparatus. For example, system memory 620 may store program code and data associated with the threat modeler 100. In some embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 600 via I/O interface 630. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 600 as system memory 620 or another type of memory. Further, a computer-readable medium may include transmission media or signals such as electrical, electromagnetic, or digital signals, conveyed via a communication medium such as a network and/or a wireless link, such as may be implemented via network interface 640. Portions or all of multiple computing devices such as that illustrated in FIG. 6 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more processors and one or more memories to store computer-executable instructions that, when executed, cause the one or more processors to implement a diagram-to-code system configured to:
    determine a plurality of software components of an application using analysis of a software design diagram representing the plurality of software components;
    determine one or more security properties of a data layer associated with the software components, wherein at least a portion of the one or more security properties are determined using input to a user interface;
    determine a property graph representing a data layer of the plurality of components, wherein the property graph is determined based at least in part on analysis of the software design diagram and the one or more security properties;
    generate one or more customized program code packages based at least in part on the software design diagram and the property graph, wherein the one or more customized program code packages implement one or more security controls associated with an infrastructure of the application; and
    compile the one or more customized program code packages and additional program code from a developer into a compiled version of the application, wherein execution of the compiled application mitigates one or more security vulnerabilities using the one or more security controls.

2. The system as recited in claim 1, wherein the one or more memories store additional computer-executable instructions that, when executed, cause the one or more processors to:
    validate syntax and semantics of the one or more customized program code packages.

3. The system as recited in claim 1, wherein the one or more customized program code packages are determined using parameterization of one or more secure code templates.

4. The system as recited in claim 1, wherein the one or more customized program code packages are determined using a neural network, wherein the neural network is trained using a plurality of secure code templates.

5. A computer-implemented method performed by one or more computing devices, comprising:
    determining, by a diagram-to-code system, one or more security properties of a plurality of components associated with a software product, wherein relationships between the components are indicated in a software design diagram, and wherein at least a portion of the one or more security properties are determined using input to a user interface;
    determining, by the diagram-to-code system, a property graph representing a data layer of the plurality of components, wherein the property graph is determined based at least in part on analysis of the software design diagram and the one or more security properties;
    generating, by the diagram-to-code system, one or more secure code packages based at least in part on the software design diagram and the property graph, wherein the one or more secure code packages implement one or more security controls associated with the software product; and providing the one or more secure code packages to a developer, wherein the one or more secure code packages and additional program code from the developer are compiled into a compiled version of the software product, and wherein execution of the compiled software product mitigates one or more security vulnerabilities using the one or more security controls.

6. The method as recited in claim 5, further comprising:
validating, by the diagram-to-code system, syntax and semantics of the one or more secure code packages.

7. The method as recited in claim 5, further comprising:
testing, by a data injector, the one or more secure code packages using injection of test data values.

8. The method as recited in claim 5, wherein the one or more secure code packages are determined using parameterization of one or more secure code templates.

9. The method as recited in claim 5, wherein the one or more secure code packages are determined using a neural network, wherein the neural network is trained using a plurality of secure code templates.

10. The method as recited in claim 5, further comprising:
selecting, by the diagram-to-code system, the one or more security controls based at least in part on component types of the plurality of components, wherein the one or more security controls represent secure approaches associated with the component types of the plurality of components.

11. The method as recited in claim 5, wherein an additional portion of the one or more security properties are determined by the secure code generator using one or more default security properties in the absence of user input specifying the additional portion of the one or more security properties.

12. The method as recited in claim 5, further comprising:
providing, by the diagram-to-code system to the developer, user-readable documentation associated with the one or more secure code packages, wherein the user-readable documentation represents information on customizability of the one or more secure code packages.

13. One or more non-transitory computer-readable storage media storing program instructions computer-executable on or across one or more processors to perform:
determining, by a diagram-to-code system, one or more security properties of a plurality of components associated with an application, wherein the components and relationships between the components are indicated in a software design diagram, and wherein at least a portion of the one or more security properties are determined using input to a user interface;

determining, by the diagram-to-code system, a property graph representing a data layer of the plurality of components, wherein the property graph is determined based at least in part on analysis of the software design diagram and the one or more security properties;

generating, by the diagram-to-code system, one or more secure code packages based at least in part on the software design diagram and the property graph, wherein the one or more secure code packages implement one or more security controls associated with the application; and providing the one or more secure code packages to a developer, wherein the one or more secure code packages and additional program code from the developer are compiled into a compiled version of the application, wherein execution of the compiled version of the application mitigates one or more security vulnerabilities using the one or more security controls.

14. The one or more non-transitory computer-readable storage media as recited in claim 13, further comprising additional program instructions that, when executed on or across the one or more processors, perform:
validating syntax and semantics of the one or more secure code packages.

15. The one or more non-transitory computer-readable storage media as recited in claim 13, wherein execution of the one or more secure code packages in the compiled version of the application improves policy compliance of the application, scalability of the application, or availability of the application.

16. The one or more non-transitory computer-readable storage media as recited in claim 13, wherein the one or more secure code packages are determined using parameterization of one or more code templates.

17. The one or more non-transitory computer-readable storage media as recited in claim 13, wherein the one or more secure code packages are determined using a neural network, wherein the neural network is trained using a plurality of code templates.

18. The one or more non-transitory computer-readable storage media as recited in claim 13, wherein the software design diagram is determined using input to a graphical user interface.

19. The one or more non-transitory computer-readable storage media as recited in claim 13, wherein the software design diagram is determined using selection of a template from a plurality of pre-approved templates representing a plurality of application architectures, and wherein the selection is performed based (at least in part) on input to the user interface.

* * * * *